United States Patent Office 3,186,989
Patented June 1, 1965

3,186,989
PROCESS FOR PREPARING GLUTARIMIDE DERIVATIVES
Francis Johnson, Newton Lower Falls, and William D. Gurowitz, Natick, Mass., and Martin Stiles, Ann Arbor, Mich., assignors to The Dow Chemical Company, Midland, Mich., a corporation of Delaware
No Drawing. Filed Nov. 1, 1961, Ser. No. 150,855
7 Claims. (Cl. 260—240)

The present invention is directed to a process for preparing novel α-[2-(3-glutarimidyl)ethylidene]ketones and more particularly to a process for preparing anhydrocycloheximide compounds.

It is an object of this invention to provide novel α-[2-(3-glutarimidy)ethylidene]ketones, and to provide a process for preparing α-[2-(3-glutarimidy)ethylidene]ketones.

We discovered that β-ketonic acids having at least one hydrogen atom in the alpha position can be reacted with 2-(3-glutarimidyl)acetaldehydes to yield α[2-(3-glutarimidyl)ethylidene]ketones. Cyclic ketones of the specified type, such as 2-carboxycyclohexanones, are reacted with 2-(3-glutarimidyl)acetaldehydes to form the corresponding anhydrocycloheximide compound, as illustrated in Equation I, which represents the reaction of 3-glutarimidylacetaldehyde with 2-carboxycyclohexanone to prepare α-[2-(3-glutarimidyl)ethylidene]cyclohexanone. The process in its broad aspect is illustrated in Equation II.

Equation I

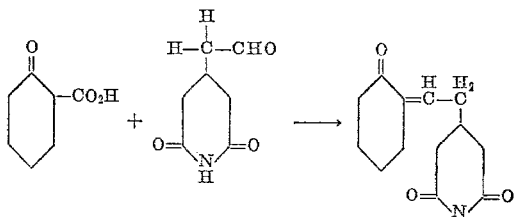

Equation II

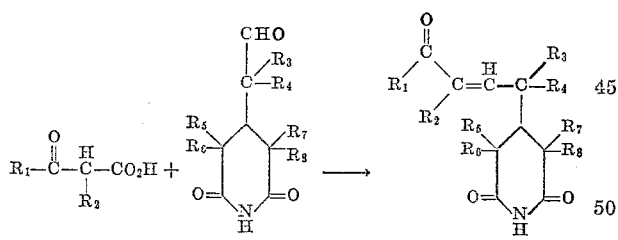

the $R_3$–$R_8$ groups may be hydrogen, or any substituting group that does not react with the reactants or the reaction products under the process conditions. These include lower alkyl, aryl, alkoxyl, aryloxyl, dialkylamino, etc., such as methyl, butyl, octyl, benzyl, phenyl, methoxyl, phenoxyl, and dimethylamino. Preferred $R_3$–$R_9$ groups are hydrogen and lower alkyl. The $R_1$ and $R_2$ groups which largely determine the character of the ketone may be any substituted or unsubstituted hydrocarbon group that is not reactive with the reactants or products under the process conditions. $R_1$ and $R_2$ may be joined to form cyclic or fused compounds, such as 2-carboxycyclohexanones and 2-carboxy tetralone-1. The hydrogen atoms on the ring carbons of these cyclic ketones, with the exception of the hydrogen in the −2 position, also may be substituted with groups or radicals that are not reactive under the process conditions. Cyclic ketones with halogen (usually chlorine or bromine and/or lower alkyl substituent(s) on the ring are preferred. Useful acyclic β-ketonic acids include acetoacetic acid and acetone dicarboxylic acid.

The reaction of the 2-(3-glutarimidyl)acetaldehydes and the ketonic acids takes place in an approximately neutral polar solvent and preferably in an aqueous system which has its pH adjusted to slight alkalinity. Other polar solvents could be used in place of water. These include alcohols, ethers, dimethylformamide and other amides, dimethylsulfoxide, etc. The reaction takes place at temperatures between −20 and +100° C.; and preferably between 0° and 30°. The time of reaction is somewhat dependent on the temperature. It is preferred to use relatively low temperatures and longer times to obtain higher yields. Although stoichiometric amounts of reactants may be used, it is preferred to use an excess of the ketonic acid.

For the purpose of giving those skilled in the art a further understanding of the invention, the following illustrative examples are given:

Example 1

2-(3-glutarimidyl)acetaldehyde (0.58 g., 0.0037 mole and 2-carboxy-6-methylcyclohexanone (2.67 g., 0.0171 mole) were dissolved in 200 ml. of an aqueous phosphate buffer ($KH_2PO_4Na_2HPO_4$) at room temperature. The pH was 7.12±0.02 units. The solution was let stand at room temperature for 14 days whereupon it was extracted three times each with 25 ml. of methylene choloride ($CH_2Cl_2$). The $CH_2Cl_2$ extracts were dried over anhydrous sodium sulfate. The sodium sulfate was filtered off and the $CH_2Cl_2$ removed under reduced pressure leaving a yellow oil (wt. 1.16 g.). Upon standing, a small amount of solid crystallized from the oil (ca. 5–10 mg.). A small amount of the solid was removed by means of a spatula. The solid was pressed dry on a filter paper. Melting point 140–141° C. (uncorrected, Fisher-Johns melting point block). The product of the reaction was α-[2-(3-glutarimidyl)ethylidene]-6-methylcyclohexanone. The ultra-violet spectrum showed a maximum at 241 m$\mu$ (ethanol solution).

Example 2

Following the procedure of Example 1, 2-carboxy-6-ethylcyclohexanone is used in place of the 2-carboxy-6-methylcyclohexanone, to obtain α-[2-(3-glutarimidyl)ethylidene]-6-ethylcyclohexanone.

Example 3

Following the procedure of Example 1, 2-carboxy-4,6-dimethylcyclohexanone is used in place of the 2-carboxy-6-methylcyclohexanone, to obtain α-[3-glutarimidyl)ethylidene]-4,6-dimethylcyclohexanone.

Example 4

Following the procedure of Example 1, 2-carboxy-6-ethylcyclohexanone is used in place of the 2-carboxy-6-methylcyclohexanone, to obtain α-[2-(3-glutarimidyl)ethylidene]-6-ethylcyclohexanone.

Example 5

Following the procedure of Example 1, 2-carboxy-4,6-diethylcyclohexanone is used in place of the 2-carboxy-6-methylcyclohexanone, to obtain α-[2-(3-glutarimidyl)ethylidene]-4,6-diethylcyclohexanone.

Example 6

Following the procedure of Example 1, 2-carboxy-chlorocyclohexanone is used in place of the 2-carboxy-6-methylcyclohexanone, to obtain α-[2-(3-glutarimidyl)ethylidene]chlorocyclohexanone.

Example 7

Following the procedure of Example 1, acetoacetic acid is used in place of the 2-carboxy-6-methylcyclohexanone, to obtain α-[2-(3-glutarimidyl)ethylidene]acetone.

Similarly, other α-[2-(3-glutarimidyl)ethylidene]ketones are prepared from starting materials corresponding to the general definition wherein substituent R groups on various ring carbons are varied. It appears that the substituents and side chains do not alter the conditions of the reaction. A salt or an ester of the β-ketonic acid which yields the equivalent acid form in the solvent may be used in place of the acid as a reactant.

The α-[2-(3-glutarimidyl)ethylidene] ketones prepared by our process have biological activity. They are active as rodent repellents and fungicidal agents.

Although our process has been described in connection with a limited number of examples, it is to be understood that our invention includes all modifications and variations as come within the scope of the appended claims.

What we claim is:

1. The process for preparing α-[2-(3-glutarimidyl)ethylidene]ketones comprising reacting a compound having the formula

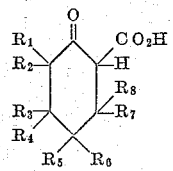

wherein $R_1$ to $R_8$ are selected from the group consisting of hydrogen, lower alkyls, and halides, with a compound of the formula

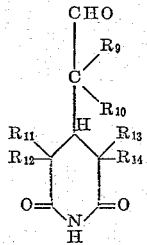

wherein $R_9$ to $R_{14}$ are selected from the group consisting of hydrogen and lower alkyl, in a slightly alkaline aqueous phosphate buffered solution at a temperature between about 0° C. and 30° C., and then separating the ketone product from the reaction mixture.

2. The process of claim 1 wherein the ketone reactant is used in an amount in excess of the stoichiometric amount.

3. The process of claim 1 in which the cyclohexanone is 2-carboxy-6-methyl cyclohexanone.

4. The process of claim 1 in which the cyclohexanone is 2-carboxy-6-ethylcyclohexanone.

5. The process of claim 1 in which the cyclohexanone is 2-carboxy-4,6-dimethylcyclohexanone.

6. The process of claim 1 in which the cyclohexanone is 2-carboxy-4,6-diethylcyclohexanone.

7. The process of claim 1 in which the cyclohexanone is 2-carboxychlorocyclohexanone.

References Cited by the Examiner

Schopf et al.: Annalen der Chemie, vol. 518, pages 127 to 140 and 152 (1935).

Lawes: J. Am. Chem. Soc., vol. 82, pages 6413 to 6414, Dec. 20, 1960.

Royals: "Advanced Organic Chemistry," page 780 and pages 790, 796, Prentice-Hall Inc, Englewood Cliffs, New Jersey, 1954.

Elsevier: "Chemistry of Carbon Compounds," vol. IIA (Alicyclic Compounds), pages 203 and 232, Elsevier Publishing Co., New York, 1953.

Kornfeld et al.: Journ. of the Am. Chem. Soc., volume 71, pages 150 to 159 (1940).

Phillips et al.: Jour. of the Am. Chem. Soc., volume 79, pages 3517 to 3519 (1957).

Frohardt et al: Journ. of the Am. Chem. Soc., volume 81, pages 5500 to 5506 (1959).

IRVING MARCUS, *Primary Examiner.*

JOHN D. RANDOLPH, WALTER A. MODANCE, *Examiners.*